July 17, 1951   A. K. FOULDS   2,561,106
FUEL FEEDING CONTROL MEANS RESPONSIVE TO AIR BLOWER PRESSURE
Filed Jan. 20, 1945
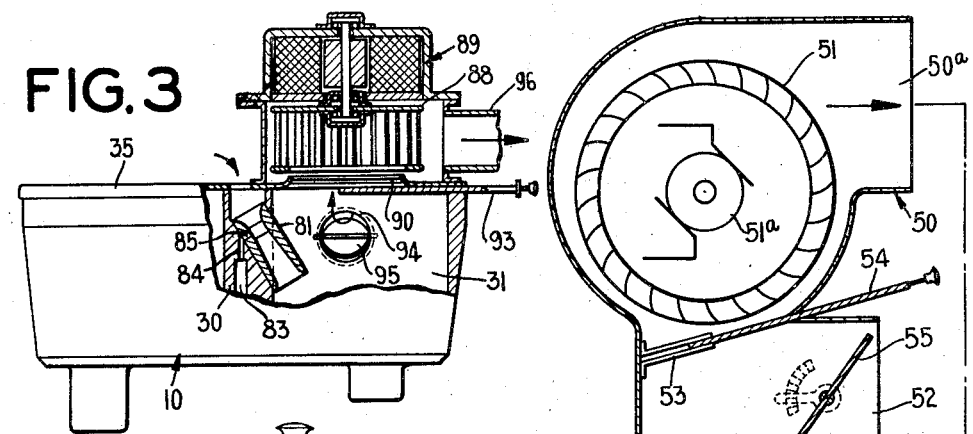
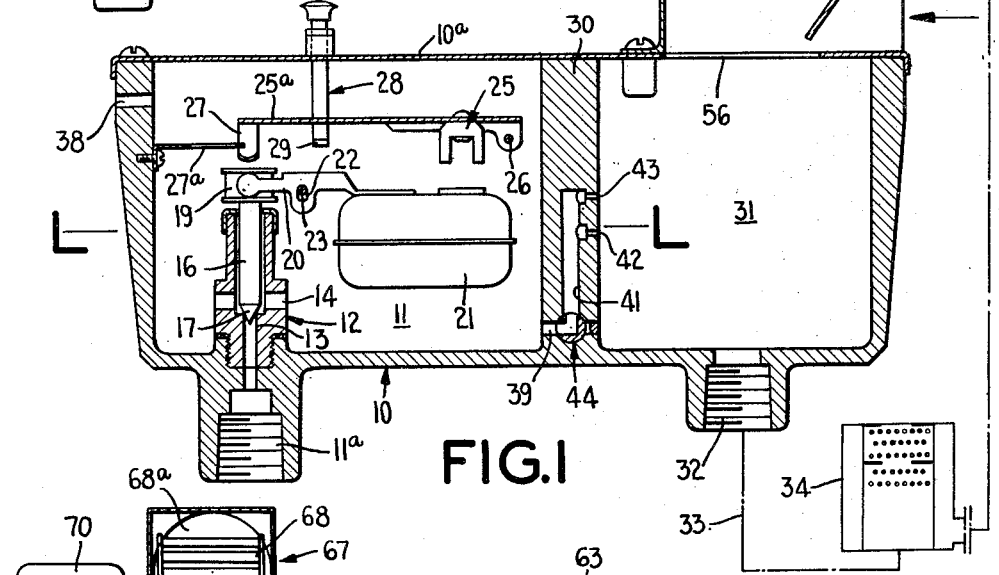
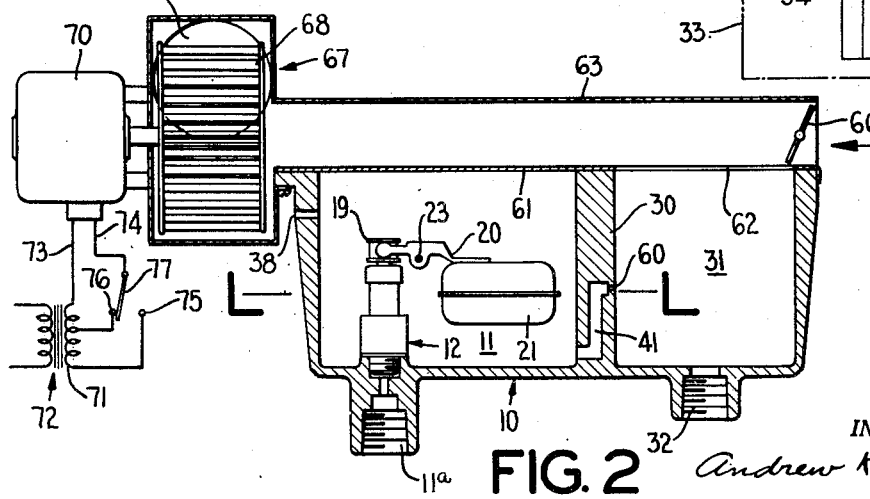
INVENTOR.
Andrew K. Foulds Patented July 17, 1951

2,561,106

UNITED STATES PATENT OFFICE 2,561,106

FUEL FEEDING CONTROL MEANS RESPONSIVE TO AIR BLOWER PRESSURE

Andrew K. Foulds, Grosse Pointe, Mich., assignor to Detroit Lubricator Company, Detroit, Mich., a corporation of Michigan Application January 20, 1945, Serial No. 573,683

6 Claims. (Cl. 158—36.1)

1

The invention relates generally to oil burners and it has particular relation to apparatus for controlling the flow of fuel oil to the burner. In a particular type of fuel burning equipment to which the invention is especially applicable, fuel oil flows to the burner under the influence of gravity, and the burner is of the so-called pot type. Ordinarily in equipment of this character a float valve has been employed in a float chamber for maintaining a certain level of oil, and a metering valve has been located in the outlet of the float chamber so that the oil flowed from the float chamber through the valve and then to the burner.

One object of the present invention is to provide improved means for controlling the flow of fuel to the burner.

Another object of the invention is to provide equipment wherein the effect of suction on the flow of fuel may be varied or adjusted in order to permit obtaining variable and desired results.

Another object of the invention is to provide improved means or equipment for controlling the flow of fuel to the burner wherein the usual metering valve is eliminated so as thereby to eliminate various precision parts and controls required where metering valves have been used.

Other objects of the invention will become apparent from the following specification, from the drawings relating thereto, and from the claims hereinafter set forth.

For a better understanding of the invention reference may be had to the drawings wherein:

Figure 1 is a cross-sectional view of a float valve device having a fuel line leading to the burner and a blower control for governing the quantity of fuel oil supplied to the burner in an arrangement constructed according to one form of the invention;

Fig. 2 is a similar view illustrating an arrangement constructed according to another form of the invention; and, Fig. 3 is a similar view showing another form of the invention.

Referring to Fig. 1, there is a casing 10 having a cover 10a and containing a float valve chamber indicated at 11 and the bottom wall of this chamber has a threaded opening 11a by means of which the chamber may be connected to a source of fuel oil. This oil flows upwardly into the chamber through a valve element 12 having a vertical inlet opening 13 leading from the opening 11a and having transverse valve outlet openings 14 at the upper end of the opening 13 so that the oil may flow upwardly through the opening 13

2 and into the chamber 11. A vertically slidable valve stem 16 has a conical end 17 adapted to vary or close the valve port or seat end of the opening 13 through which the fuel must flow. When this stem is moved downwardly a sufficient amount, the upper end of the opening 13 will be closed. At its upper end the stem is connected to a grooved head or collar 19 and the groove flanges are engaged at opposite sides by a yoke arm 20 carrying a float 21. This yoke arm has an elongated opening 22 through which a pin 23 extends and the pin is secured at its ends to opposite side walls of the float casing. This arrangement will normally cause a certain substantially constant level of oil to be maintained in the float chamber such as the level L—L.

A magnetic safety device 25 including a lever 25a is pivoted at one end, as indicated at 26 above the float, and the other end of this device carries on the end of the lever, a projection 27 which overlies and is adapted to strike the head 19 on the valve stem and forcefully close the valve. In the event the level of oil should for any reason cause the float to rise to a predetermined position near the magnet, sufficiently so that the magnetic force will overcome the friction holding spring 27a, the magnet will swing downwardly pulling the projection 27 with it with force so as to cause a striking blow to be delivered by the projection 27 against the member 19. When the valve stem has been closed under such circumstances, the parts can be returned to their normal positions by a manually movable release 28 having a hook 29 on its lower end by means of which the magnetic device may be raised against the lateral friction of the spring 27a and the force of the magnet. This manual release projects upwardly through a guide opening in the casing cover 10a and is therefore accessible above and from the exterior of the casing.

The float casing includes a second chamber, indicated at 31, which is divided from the float chamber proper by a partition 30, and the bottom wall of the second chamber 31 has a threaded opening or outlet 32 which may be connected to a fuel line 33 leading to a burner 34. In the side wall of the float chamber a vent 38 is provided to maintain atmospheric pressure above the oil. Oil flows from the float chamber 11 into the supply chamber 31 through an opening 39 in the partition 30 located adjacent the bottom of the latter, and this opening communicates with an upwardly directed opening or passageway 41 in the partition. The latter opening 41 in turn communicates with two small vertically separated openings 42 and 43 leading to the chamber 31. A valve 44 may be provided at the junction of the openings 39 and 41 for closing the inner end of the opening 39 or the passageway 41, if desired. It should now be evident that if the oil in the vertical passageway 41 is at a certain height, such as to the line L—L above mentioned, the oil will flow through the opening 42, and if the height of the oil is sufficiently increased, the oil also can flow through the opening 43.

It will be seen according to the construction hereafter to be described that the level of the oil in the vertical passageway 41 can be raised by controlling the degree of suction in chamber 31 relative to the pressure in the chamber 11 or in other words, by reducing the air pressure therein, and that in accordance with the reduction in air pressure, a variable amount of oil can be made to flow into the chamber 31. What this really means is that the differential in air pressure between the pressure above the oil in the float chamber 11 and the air pressure in chamber 31, will cause oil to flow into the chamber 31 in accordance with this variation or differential in pressure. Hence, by increasing the differential, more oil can be supplied to the burner as for instance, to supply oil for a high fire, and by decreasing the differential the amount of oil can be decreased so as to support a low fire.

Where the two openings 42 and 43 are used, the opening 42 may be a small opening through which oil will flow at all times while the upper opening 43 may be so located that oil will flow through it only in the high fire stage. These openings may be so related to the oil level in the float chamber and to the differential in air pressure, and be of such size that in the low fire stage sufficient oil will flow through opening 42 alone whereas in the high fire stage, oil will flow through both openings. The flow through one or both openings may of course be varied by varying the differential in air pressure and it may be preferable to have the opening 42 located as shown so that oil will flow through it even if there isn't any differential in air pressure.

For accomplishing the differential in air pressures above mentioned, a blower 50 for supplying air through the blower outlet 50a to the burner, is mounted on and connected to the casing 10 above the chamber 31. This blower includes a rotary impeller means or fan wheel 51 driven by an electric motor 51a. Adjacent the cover 10a, an inlet 52 from atmosphere is provided for the blower and this leads to a gate opening 53 which may be variably adjusted in size by a sliding gate or valve 54 so as to control the air inlet opening leading to the blower. A pivotal damper 55 with means for holding or locking it in adjusted position is also provided in the inlet 52 so as to variably govern this opening. The blower casing communicates with the chamber 31 through its inlet 52 by means of an opening 56 in the cover 10a, the chamber 31 being otherwise closed to atmosphere. It will, therefore, be appreciated that the air pressure in chamber 31 may be reduced by fan suction and that the suction in chamber 31 may be varied by changing the blower speed and by adjusting the gate 54 and damper 55. If, with a given damper setting, the blower is operating at full speed, a greater suction will be obtained in the chamber 31 so as to cause more oil to flow into the chamber 31, and if the blower is operating for instance at half speed, a reduced suction, i. e., a higher absolute pressure, exists so as to reduce the quantity of oil entering the chamber 31. This control of the air inlet will also control the air supply to the burner 34 and, as will be apparent, will maintain within limits the desired fuel-air ratio. It should be understood that normally the fuel line 33 contains oil so that the chamber 31 will be closed to the atmosphere through the line 33. Usually the oil will flow into chamber 31 through the port or inlet 42 and collect on the chamber bottom, to flow therefrom over the upper edge of opening 32 without building up any oil level in the chamber or head pressure on the oil line 33. A certain height of oil, depending on the rate of inflow to the chamber 31, will be maintained in the upwardly extending part of the line 33 leading to opening 32 and this height will maintain the same level in the burner 34.

In the construction shown by Fig. 2, the same float chamber 11 is provided and the partition 30 separates this float chamber from the chamber 31. In this case the partition has a single small opening or calibrated port 60 at the outlet of the passageway 41 and through which oil flows from the float chamber 11. A cover 61 closes the casing and the top wall openings of chambers 11 and 31, except for an opening 62 above chamber 31. The blower includes an air inlet conduit 63 which extends over the casing and has its bottom wall formed by the cover 61. The conduit 63 has its inlet adjustably closed by a pivotal damper 66 governing the inlet of air, and the opposite end of the conduit leads to the casing 67 of the blower which has a fan wheel or impeller means 68 therein. An outlet duct 68a from the casing 67 leads to the burner 34. The blower is driven by an electric motor 70 and the circuit of this motor includes the secondary 71 of a transformer 72. The secondary 71 has one end of its coil connected directly to a wire 73 leading to the motor. The other terminal of the motor is connected to a wire, indicated at 74, adapted to be connected to a selective switch having a contact 75 connected to the other end of the transformer element 71 and having a contact 76 connected to a middle point on the transformer element, or secondary coil, and this selective connection may be effected by a switch element 77. A thermostatic control element, such as bimetal, may be employed to operate the contact end of the switch element 77. Then, when a high fire is required, the thermostatic element being properly arranged, the switch element 77 will be swung over for engagement with the contact 75, and then when a low fire is required the switch element will be swung into engagement with the contact 76. When the contact 75 is engaged by the switch element 77, the motor 70 will operate at full speed and then when the contact 76 is engaged, the motor 70 will operate approximately at half speed. This same type of control may be employed in connection with the motor 51a shown in Fig. 1.

The device shown in Fig. 2 operates similarly to the arrangement shown in Fig. 1 in that, suction in the duct 63 will create a certain suction or reduced air pressure in the chamber 31 above the oil. Hence, more oil will flow through the aperture 60 when the blower is operating at full speed and a smaller quantity of oil will flow through when the blower is operating at half speed. Controls, such as the damper 66, may be used to vary these results by regulating the admission of air to the blower wheel 68 and regulating the absolute air pressure in the chamber 31 so that the flow of oil may be governed as desired.

In Fig. 3 the partition 30 has a vertical passageway opening through its upper edge and fastened and extending laterally into this passageway there in a Venturi tube 81. This tube extends upwardly to communicate through the passageway with an opening in the cover 35 and extends downwardly into the chamber 31, and its opposed ends are open to the atmosphere and to the chamber, respectively. The opening or passageway from the float chamber and in the partition through which oil flows is indicated at 83 and this opening has a smaller upper end 84 which communicates with an opening 85 extending through the side wall of the tube 81 at its throat so that oil flows into the latter. Air drawn downwardly through the tube will, by Venturi action, cause oil to flow into the tube and thence be discharged into the chamber 31.

The blower in this arrangement has a fan wheel indicated at 88 and it is driven by a motor 89. The axis of the motor and blower wheel is vertical and the central part or eye of the blower wheel is immediately above an opening 90 in that part of the cover over the chamber 31. A gate or valve 93 is employed for adjustably closing the opening 90 so as to vary the air flow to the fan wheel. The side wall of the casing defining the chamber 31 has an air inlet opening 94 which may be adjustably opened or regulated by a damper 95. This latter opening is utilized to supplement the Venturi air supply to allow air to flow in larger quantities into the chamber. A duct 96 leads from the blower casing to an air housing of the burner.

It is apparent that the damper 95 and gate 93 may be adjusted so as to supply the blower with the air needed and that these controls may be so related to the Venturi tube 81 that the desired amount of air will be drawn in through the latter to govern the flow of oil. If the damper 95 is opened fully, less air is drawn in through the tube 81 and hence, suction of oil into the chamber 31 is reduced. Control of the motor may be effected in the same manner as previously described in order to obtain the full and reduced speeds required for high and low fires, respectively.

All forms of the invention provide a means for controlling the flow of oil to the burner which is related to and governed by air suction or reduced air pressures at the intake side of the blower which is preferably employed to furnish air to the burner. Hence, the supply of oil may be related to the operation of the blower in an automatic manner so that the quantity of oil supplied will automatically be varied to correspond to the speed of the blower or to the quantity of air supplied. The invention moreover eliminates the need for an adjustable metering valve which must be moved either manually or by thermostatic control to vary the supply of oil. Certain movable parts are thus eliminated and accordingly there is less likelihood of interruption in the operation of the heating system as occasionally may occur where metering valves are employed. Additionally the invention is characterized by reduction in cost of manufacture due to simplicity and the eliminating of movable parts.

Although more than one form of the invention has been illustrated and described in detail, it will be apparent to those skilled in the art that various modifications may be made without departing from the scope of the claims.

What is claimed is:

1. A burner control apparatus comprising means forming a chamber having an outlet for supplying liquid fuel to a burner, means forming a second chamber for containing liquid fuel, means for maintaining a predetermined constant liquid level in said second chamber, a passageway from said second chamber having an inlet below said liquid level and having an outlet communicable with said first-named chamber at a point above said liquid level, a blower for supplying air to a burner and having its intake side communicable with said first-named chamber and operable to produce a reduced pressure therein relative to said second chamber, an air intake passageway for said blower and including said first-named chamber, said reduced pressure being operable to cause flow of air through said intake passageway, means positioned in said intake passageway and operable in response to the linear velocity of air flowing therethrough and cooperable with said first-named passageway to cause the liquid therein to rise above said liquid level for discharge into said first-named chamber, and a pair of dampers positioned on the intake side of said blower and operable jointly to control independently the volume of air flowing to said blower and the amount of pressure reduction in said first-named chamber.

2. A burner control apparatus comprising means forming a chamber having an outlet for supplying liquid fuel to a burner, means forming a second chamber for containing liquid fuel, means for maintaining a predetermined constant liquid level in said second chamber, a passageway from said second chamber having an inlet below said liquid level and having an outlet communicable with said first-named chamber, a blower for supplying air to a burner and having its intake side communicable with said first-named chamber and operable to produce a reduced pressure therein relative to said second chamber, an air intake passageway for said blower and including said first-named chamber, said reduced pressure being operable to cause flow of air through said intake passageway, a Venturi tube positioned in said intake passageway and operable in response to the linear velocity of air flowing therethrough, said first-named passageway opening into said Venturi tube at a point above said liquid level, said Venturi tube being cooperable with said first-named passageway during flow of air to cause the liquid in said first-named passageway to rise above said liquid level for discharge into said first-named chamber, and a pair of dampers positioned on the intake side of said blower and operable jointly to control independently the volume of air flowing to said blower and the amount of pressure reduction in said first-named chamber.

3. A burner control apparatus comprising a casing enclosing a space, a wall in said casing dividing said space into two chambers, one of said chambers having an outlet for supplying liquid fuel to a burner, means for maintaining a constant liquid level in the other of said chambers, a passageway extending vertically in said wall and having an inlet from said other chamber below said liquid level and having an outlet into said one chamber above said liquid level, a blower for supplying air to a burner, said blower having an air intake chamber having a pair of air inlets and being carried by said casing above said one chamber, one of said air inlets opening into said one chamber and the other inlet opening to atmosphere, said blower being operable to draw air through said one inlet to produce a reduced pressure in said one chamber relative to said other chamber, a damper for controlling flow of air through said other inlet, a second damper for controlling flow of air from said air intake chamber to said blower, the pressure differential between said chambers during operation of said blower being operable to cause the liquid in said passageway to rise above said liquid level and to discharge into said one chamber, and said first-named and said second dampers being operable upon adjustment to determine independently both the volume of air delivered by said blower and the amount of pressure reduction in said one chamber thereby controlling the ratio of air to fuel delivered to the burner.

4. A burner control apparatus comprising a casing enclosing a space, a wall in said casing dividing said space into two chambers, one of said chambers having an outlet for supplying liquid fuel to a burner, means for maintaining a constant liquid level in the other of said chambers, a passageway extending vertically through said wall and having an inlet from said other chamber below said liquid level and having an outlet communicable with said one chamber, the point of discharge of liquid from said passageway being above said liquid level, a blower for supplying air to a burner and carried by said casing and closing the upper portion of said one chamber, a first inlet from said one chamber to said blower, second and third inlets from atmosphere into said one chamber, a damper for controlling the flow of air from said one chamber to said blower through said first inlet, a second damper for controlling flow of air through said second inlet, said blower being operable to draw air from said one chamber to produce a reduced pressure therein and to cause air to flow into said one chamber through said second and third inlets, a Venturi tube positioned in said third inlet, said passageway opening into said Venturi tube, said Venturi tube being operable in response to flow of air therethrough to cause liquid in said passageway to rise above said liquid level and to discharge through said Venturi tube into said one chamber, the amount of fuel discharged into said venturi varying with the linear velocity of air passing therethrough, and said first and said second dampers being operable to determine independently both the volume of air delivered by said blower and the velocity of air through said Venturi tube thereby controlling the ratio of air to fuel delivered to the burner.

5. A burner control apparatus comprising means forming a chamber having an outlet for supplying liquid fuel to a burner, means forming a second chamber, means for maintaining a constant level in said second chamber, a passageway interconnecting said chambers for flow of fuel therebetween, means forming an air flow passageway for supplying air to a burner, a blower interposed in said air flow passageway, a pair of dampers in said air flow passageway, and one of said chambers opening into said air flow passageway at a point between said dampers, said dampers being independently adjustable and operable jointly to determine the volume of air discharged from said air flow passageway by said blower and the pressure in said one chamber.

6. In a burner control apparatus: fuel feeding means comprising a liquid fuel supply chamber and an outlet passageway therefrom arranged therefrom to effect a flow of fuel in accord with a differential of air pressure between said chamber and the outlet end of said passageway; means forming an air flow passageway for supplying air to a burner, a blower interposed in said air flow passageway for effecting a flow of air, a pair of dampers in said air flow passageway independently adjustable to control both the volume of air discharged therefrom and the air pressure in the passageway space between the dampers, and said fuel feeding means communicating with the passageway space between said dampers so that the air pressure differential thereacross will be varied with damper adjustment.

ANDREW K. FOULDS.

REFERENCES CITED

The following references are of record in the file of this patent:

UNITED STATES PATENTS

| Number | Name | Date |
|---|---|---|
| 1,583,238 | Scudder | May 4, 1926 |
| 1,645,443 | Meyers | Oct. 11, 1927 |
| 1,655,246 | Schermuly | Jan. 3, 1928 |
| 1,665,145 | Peltz | Apr. 3, 1928 |
| 1,684,500 | McKee | Sept. 18, 1928 |
| 1,774,714 | Lavoie | Sept. 2, 1930 |
| 1,854,749 | Lord | Apr. 19, 1932 |
| 2,223,381 | Mock | Dec. 3, 1940 |
| 2,290,770 | Schumann | July 21, 1942 |
| 2,317,556 | Russell | Apr. 27, 1943 |
| 2,367,038 | Martin | Jan. 9, 1945 |
| 2,397,986 | Fenninger | Apr. 9, 1946 |

FOREIGN PATENTS

| Number | Country | Date |
|---|---|---|
| 742,365 | France | Dec. 27, 1932 |